United States Patent

Hongou et al.

Patent Number: 5,356,173
Date of Patent: Oct. 18, 1994

[54] STEERING WHEEL UNIT INCLUDING AIR BAG MODULE

[75] Inventors: Suzuaki Hongou; Shinichi Goto, both of Aichi, Japan

[73] Assignee: Toyoda Gosei Co., Ltd., Nishikasugai, Japan

[21] Appl. No.: 967,873

[22] Filed: Oct. 28, 1992

[30] Foreign Application Priority Data

Oct. 28, 1991 [JP] Japan .................. 3-088300[U]
Oct. 28, 1991 [JP] Japan .................. 3-281216

[51] Int. Cl.⁵ .................. B60R 21/20; B62D 1/04
[52] U.S. Cl. .................. 280/728 A; 280/731; 74/552
[58] Field of Search .......... 280/731, 728 A, 730 R, 280/732, 728 R; 74/552

[56] References Cited

U.S. PATENT DOCUMENTS

| | | | |
|---|---|---|---|
| 3,819,205 | 6/1974 | Dunford et al. | 280/731 |
| 4,974,873 | 12/1990 | Kaiguchi et al. | 280/735 |
| 5,024,464 | 6/1991 | Kawaguchi et al. | 280/731 |
| 5,039,125 | 8/1991 | Buma et al. | 280/731 |
| 5,056,814 | 10/1991 | Shiraki et al. | 280/731 |
| 5,066,038 | 11/1991 | Frantom et al. | 280/731 X |
| 5,149,127 | 9/1992 | Manabe et al. | 280/731 |
| 5,188,000 | 2/1993 | Kaga | 280/731 X |

FOREIGN PATENT DOCUMENTS

| | | |
|---|---|---|
| 0488618 | 6/1992 | European Pat. Off. |
| 4008960 | 9/1991 | Fed. Rep. of Germany |
| 4111883 | 10/1991 | Fed. Rep. of Germany |
| 0219449 | 9/1988 | Japan .................. 280/731 |
| 0306847 | 12/1990 | Japan .................. 280/728 A |
| 0310141 | 12/1990 | Japan .................. 280/732 |
| 2192841 | 1/1988 | United Kingdom |
| 2216477 | 10/1989 | United Kingdom |

OTHER PUBLICATIONS

Patent Abstracts of Japan, vol. 13, No. 25, (M-787) (3373) 20 Jan. 1989 and JP-A-63 235 144 (Honda Motor Co., Ltd.) abstract.

Primary Examiner—Margaret A. Focarino
Assistant Examiner—Peter English
Attorney, Agent, or Firm—Cushman, Darby & Cushman

[57] ABSTRACT

A steering wheel unit is provided which includes an air bag module and a steering wheel having a metal core, and in which the rigidity of the posterior spoke portions is not reinforced because the module is fastened to the anterior spoke portions of the core. The steering wheel unit W according to the present invention includes a steering wheel 1 having three or more spokes S, and an air bag module M fastened to the fastening parts 8 of the right and left anterior spoke portions 3s(f) of the core and disposed over the boss B of the wheel.

2 Claims, 3 Drawing Sheets

STEERING WHEEL UNIT INCLUDING AIR BAG MODULE

BACKGROUND OF THE INVENTION

1. Field of the Invention

The present invention relates to a steering wheel for a motor vehicle and, more particularly, to a steering wheel unit including an air bag module.

2. Description of the Related Art

An air bag module for a conventional steering wheel unit of the type having four spokes fastened to spoke portions of its metal core, is described in U.S. Pat. No. 3,819,205. Although the plane P on which the rim R of the steering wheel extends as shown in FIG. 4, it is desireable for the top of the inflated air bag 12 of the module to extend substantially vertically at the time of actuation so as to maximize the cushioning action of the bag. It is also desireable for the inflated air bag 12 to be controlled so as to move backward, not forward (toward the driver), while rotating about the axis of the boss B of the steering wheel.

For that reason, it is desireable for the rigidity of the anterior spoke portions 3s(f) of the metal core of the wheel, which support the ring R at the front portion thereof, to be relatively high and for the rigidity of the posterior spoke portion 3s(r) which support the ring R at the wheel portion thereof to be relatively low, to appropriately determine the rigidity of the ring, which supports the inflated air bag 12 along nearly the entire circumference of the ring.

The air bag is normally folded in the module. A cover made of a soft synthetic resin covers the folded air bag and an inflater is provided for supplying a prescribed gas into the bag to inflate it. A box-shaped holder made of a metal plate holds the bag, the cover, and the inflater. The holder is sufficiently rigid that it does not deform when the air bag is inflated. Since the air bag module is fastened to the anterior and posterior spoke portions of the metal core of the steering wheel, the rigidity of those portions is reinforced, making it difficult to plastically deform those portions, particularly the posterior portion whose rigidity is desirably relatively low.

The above-mentioned conventional air bag module is fastened to the steering wheel of the unit as described in U.S. Pat. No. 3,819,205. The air bag module includes fastening portions which extend downwardly from the body of the module and have fastening holes substantially vertically penetrating the body of the fastening portions. The spoke portions of the metal core of the steering wheel have fastening holes extending substantially vertically therethrough and corresponding to the fastening holes of the fastening portions of the modules. The module is then fastened to the wheel with bolts which are fitted into the fastening holes of each of the module and the core.

Because the fastening holes extend through the fastening portions of the air bag module and the spoke portions of the metal core of the steering wheel, it is difficult to insert the bolts through the holes to fasten the module to the wheel, because of interference by the module. For that reason, it would be desireable to provide fastening holes which extend substantially horizontally, rather than vertically. Furthermore, since a strong force acts vertically in the axial direction of the ring of the steering wheel when the air bag module is actuated, it would also be desireable for the fastening holes to extend substantially horizontally, from the standpoint of the strength of the unit.

It is generally not problematic for such fastening portions to have substantially horizontal fastening holes. However if the metal core is manufactured from an aluminum alloy, a magnesium alloy, or the like by die-casting and the fastening holes are provided so as to extend substantially horizontally, it is necessary to use a slide core for die-casting, or to drill the holes after casting.

Indeed, during die-casting, dies are opened from and closed against each other in the axial direction of the ring of the metal core, which is substantially perpendicular to the direction of horizontal fastening holes. For that reason, if the metal core is manufactured by die-casting, and fastening holes are provided so as to penetrate substantially horizontally, it is necessary to use a slide core for casting or to drill the holes after casting. Manufacturing the metal core in this manner may take a great deal of time and is difficult.

SUMMARY OF THE INVENTION

It is an object of the present invention to solve the above-identified problems of conventional steering wheel units having an air bag module.

Accordingly, it is an object of the present invention to provide a steering wheel unit including an air bag module wherein the steering wheel has a metal core in which the rigidity of the posterior spoke portions is not reinforced because the module is fastened to the anterior spoke portions of the core. The steering wheel unit provided in accordance with the present invention includes a steering wheel having at least three spokes, the air bag module being fastened to spoke portions of the metal core of the wheel and disposed over the boss of the wheel. The unit is characterized from that the module is fastened to the right and left anterior spoke portions of the core.

Because the air bag module provided in accordance with the present invention is fastened to the right and left anterior spoke portions of the metal core so as to be supported by those portions but not directly supported by the posterior spoke portions of the core, the rigidity of the module does not affect that of the posterior spoke portions.

It is a further object of the present invention to provide a steering wheel unit having a steering wheel whose metal core can be easily manufactured through die-casting even though fastening openings for fastening the air bag module to the wheel are provided so as to substantially horizontally penetrate the body of the core.

Thus, the steering wheel unit provided in accordance with the present invention includes a steering wheel and an air bag module. The module includes fastening portions extending downwardly from the body of the module and having fastening holes which extend substantially horizontally through the fastening portions. The die-cast metal core of the invention has fastening openings extending substantially horizontally into the body of the core and which correspond to the fastening holes. The modules are fastened to the wheel by bolts which are inserted through the holes and the openings. The unit is characterized in that the metal core has seat surfaces over the fastening openings so that the peripheral surface of the bottom portion of the body of the module, which is located outside the fastening portion, is in contact with the seat surface and the bottoms of the openings are not closed by the fastening parts of the core.

The air bag module of the steering wheel provided in accordance with the present invention is fastened to the steering wheel by means of bolts fitted in the fastening holes of the fastening portions of the module and the fastening openings of the metal core of the wheel. As a result, contact of the bolts with the metal core at the tops of the fastening openings prevents upward movement of the air bag module and contact of the peripheral surface of the bottom portion of the body of the module with seat surfaces of the core prevents downward movement of the module, although the bottoms of the fastening openings are not closed by the fastening parts of the core. For that reason, the integrity of the fastening of the module to the wheel is sufficient.

Furthermore, because the module is fastened to the wheel with bolts which are fitted horizontally through the holes and the openings, the module does not interfere with the fastening process and, thus, it is easy to secure the module to the wheel. Since the bottoms of the fastening openings of the metal core are not closed by the fastening parts, dies which are opened vertically in the axial direction of the ring can be used to manufacture the core through die-casting without the use of a slide core. Likewise, it is not necessary to drill openings in the core after casting. Accordingly, in accordance with the invention a metal core having horizontally extending fastening openings to enable the module to be fastened to the wheel can be easily manufactured through die-casting.

DETAILED DESCRIPTION OF THE PREFERRED EMBODIMENTS

An embodiment of the present invention is hereafter described with reference to the drawings attached hereto.

Figure 1:
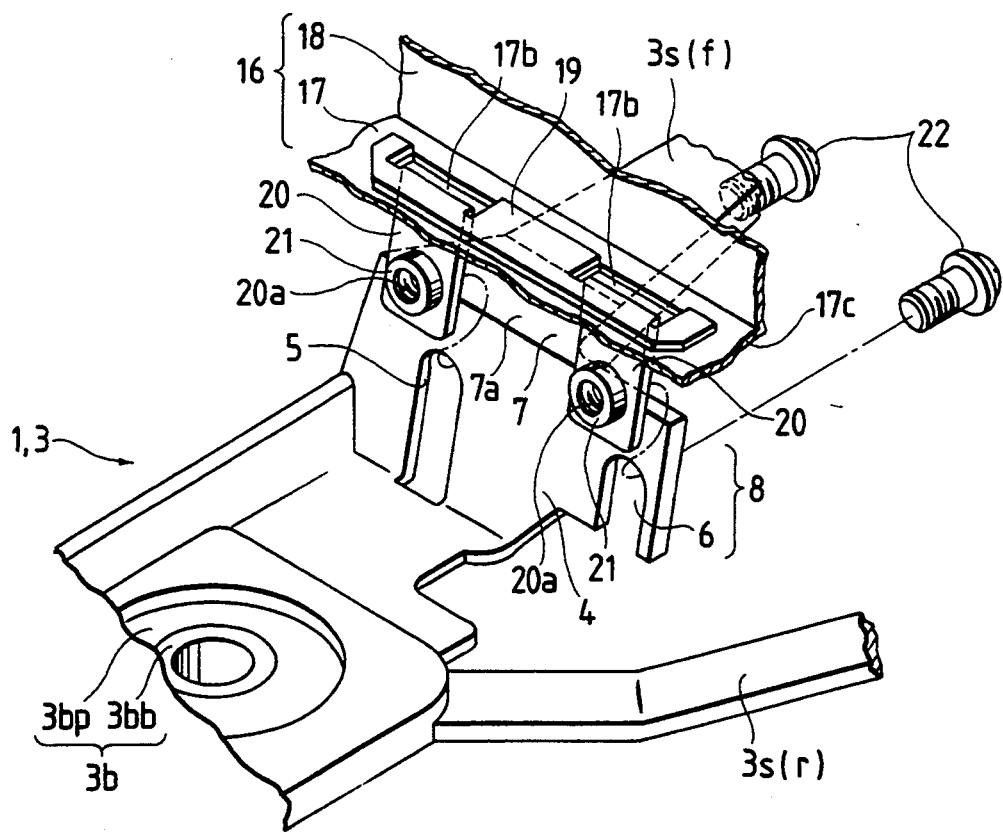
FIG. 1 is an exploded perspective view of a steering wheel unit in accordance with the present invention, and which shows how the air bag module is fastened to the anterior spoke of the metal core of the steering wheel.
Figure 2:
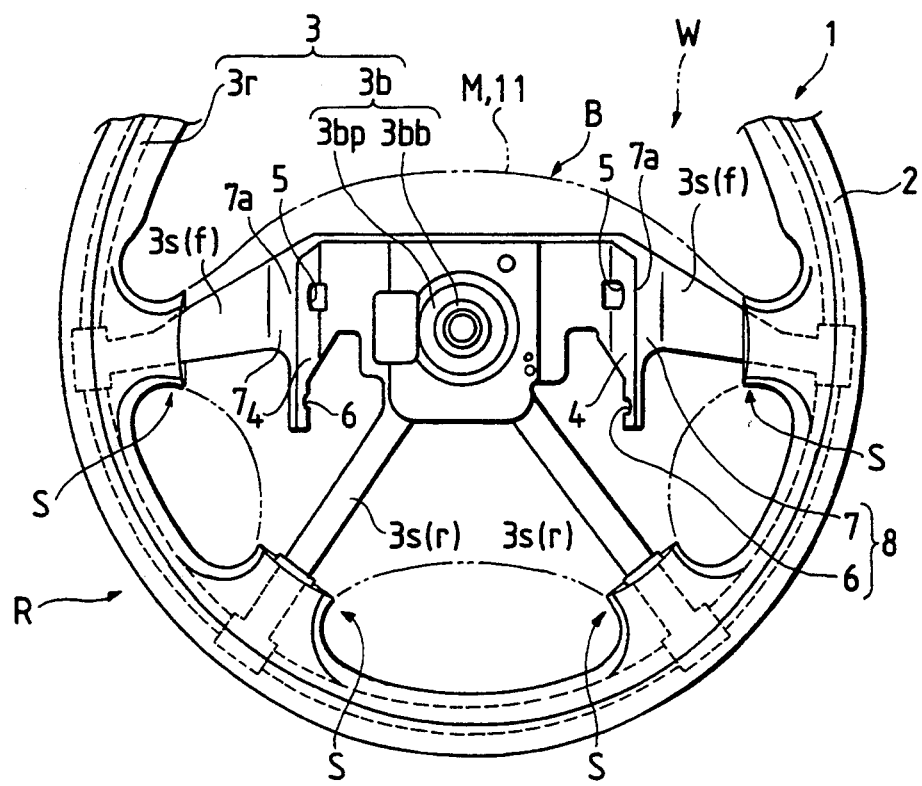
FIG. 2 is a top plan view of the wheel.
Figure 3:
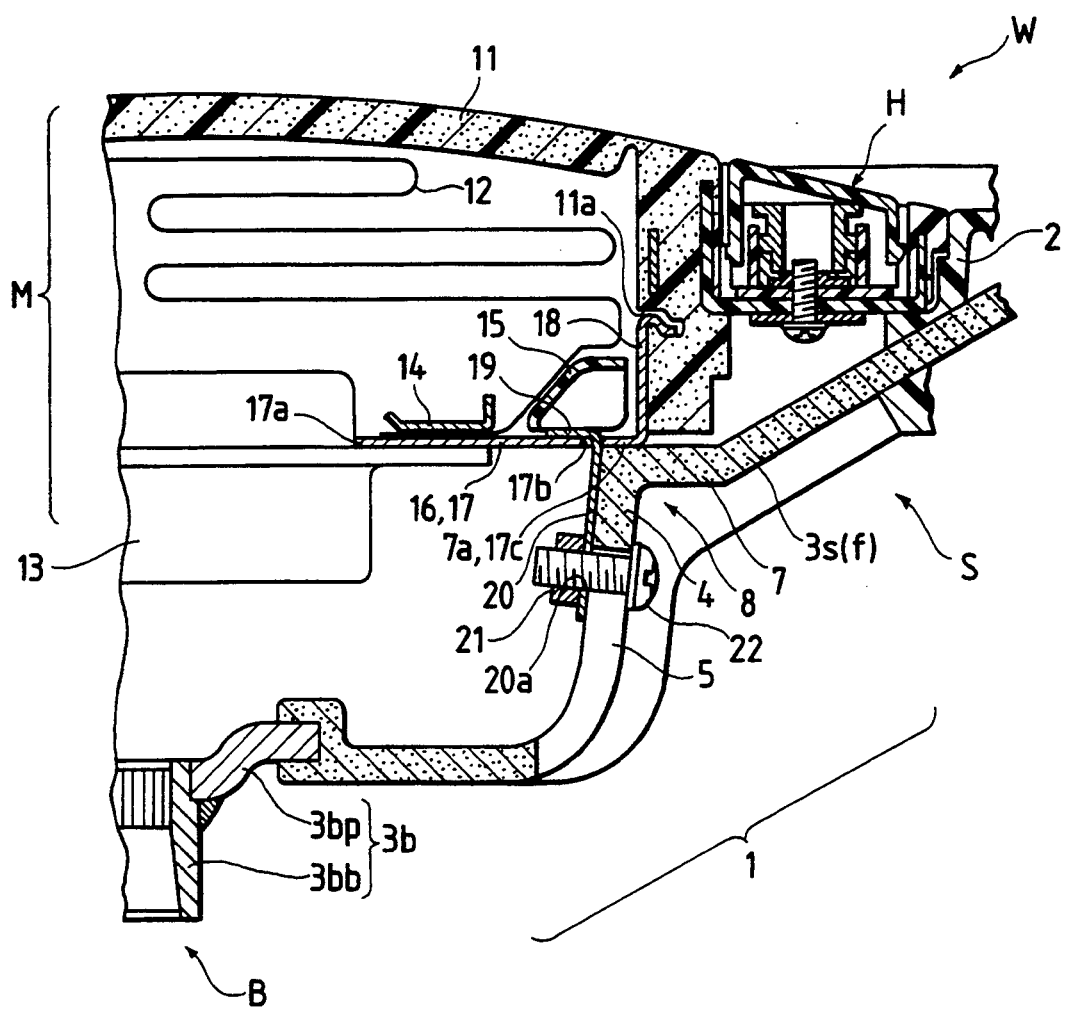
FIG. 3 is a partial sectional view of the unit, showing the module fastened to the wheel.
Figure 4:
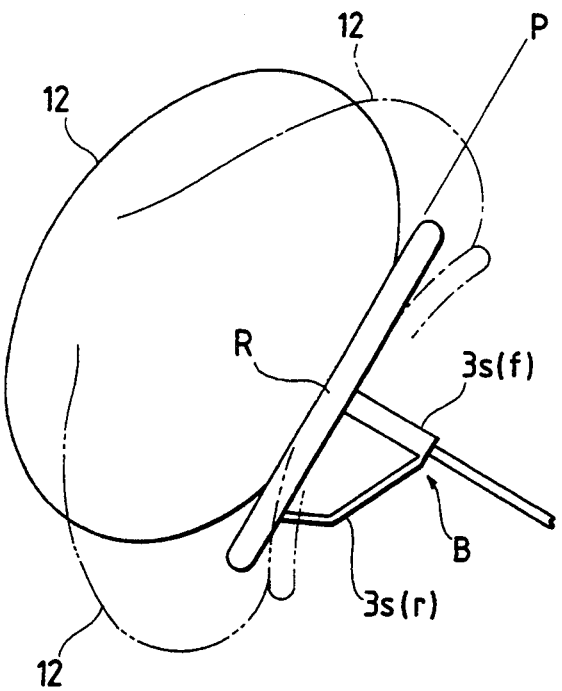
FIG. 4 is a schematic view showing the inflated air bag.

FIGS. 1, 2 and 3 show a steering wheel unit W. The unit W includes a steering wheel 1, and an air bag module M. The steering wheel 1 includes a ring R, a boss B located at the center of the ring, and four spokes S linking the ring and the boss together. The air bag module M is fastened to the steering wheel 1, so as to be located over the boss B of the wheel. Since the right and left halves of each of the wheel 1 and the module M are virtually symmetric to each other, the left half is not shown in FIGS. 1 and 3 and is not described in as great detail herein as the right half.

The air bag module M includes a cover 11 made of a soft synthetic resin and defining the top of the module, an air bag 12 folded under the cover so as to inflate outwardly in a prescribed manner while breaking the cover, an inflator 13 for supplying a prescribed gas into the bag to inflate it, and a box-shaped holder 16 made of a metal plate and holding the cover, the bag and the inflator. The module also includes a fastener 14 for fastening the air bag 12 to the holder 16 by urging the bag on the inner surface of the lowermost portion thereof against the holder with bolts or the like. A horn switch mechanism is shown at H in FIG. 3.

The holder 16 includes a nearly oblong-shaped bottom portion 17 having a central through hole 17a in which the inflator 13 is fitted, and a wall 18 extending up from the four peripheral edges of the bottom portion and engaged in the fitting hole 11a of the cover 11. The bottom portion 17 has two through holes 17b near each of the right and left ends of the portion. Brackets 19 are welded or otherwise secured to the bottom portion 17 and located on the edges of the through holes 17b. Each of the brackets 19 has fastening portions 20 extending down through the holes 17b and having fastening holes 20a extending substantially horizontally therethrough. Nuts 21 are welded to the inner surfaces of the lower parts in surrounding relation to the fastening holes 20a. A base 15 made of a synthetic resin is secured to the bottom portion 17 of the holder 16 so that the base closes the folded air bag 12 at the periphery thereof (FIG. 3).

The steering wheel 1 has a metal core 3 provided in the form of ring R, boss B and spokes S; a coating layer 2 made of a soft synthetic resin; and a lower cover covering the bottom of the boss (not shown in the drawings). The metal core 3 has a ring portion 3r formed from a steel bar and included in the ring R, a boss portion 3b included in the boss B, and spoke portions 3s made of a die-cast aluminum alloy or the like and linking the ring portion and the boss portion together. The boss portion 3b includes a hub 3bb made of steel and coupled to a steering shaft (not shown), and a flange 3bp made of a steel plate and welded to the hub. The coating layer 2 coats the ring portion 3r of the metal core 3, and parts of the spoke portions 3s thereof.

The right and left anterior spoke portions 3s(f) of the metal core 3 which extend rightward and leftward, respectively, from the boss B, have vertical parts 4 extending substantially vertically upwardly from the top of the boss, and horizontal parts 7 extending substantially horizontally, therethrough and correspond to the fastening holes 20a of the fastening portions 20 of the air bag module M. The bottom of the opening 5 is not closed by the vertical part 4, but is located in a horizontal part extending from the bottom of the vertical part 4 to the flange 3bp of the boss portion 3b. The bottom of the other opening 6 is not closed by the vertical part 4 either. The tops of the fastening openings 5 and 6 are disposed so that the peripheral surface 17c of the bottom portion 17 of the holder 16, which surrounds the fastening portions 20, is in contact with the seat surface 7a of the horizontal part 7 of the metal core 3 when bolts 22 are fitted in the fastening holes 20a of the fastening portions and the fastening openings 5 and 6 of the core and engaged with the nuts 21 to fasten the air bag module M to the boss B.

Figure 5:
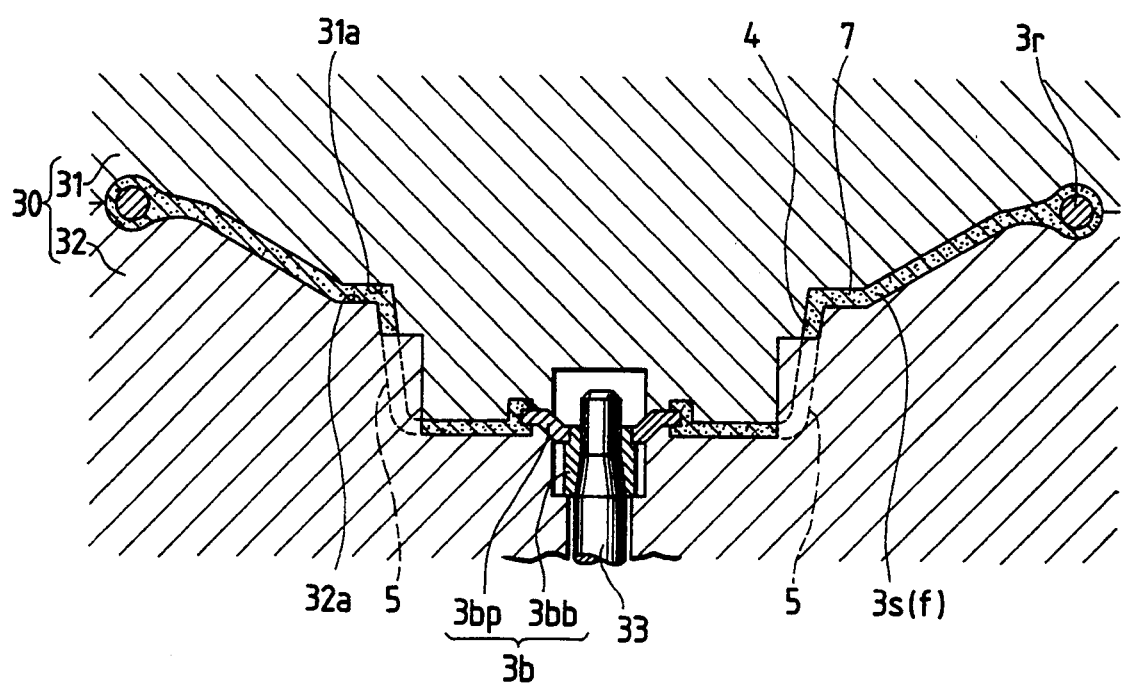
FIG. 5 is a sectional view illustrating how the metal core is cast.

The manufacture and assembly of the steering wheel unit W are described herein below. The spoke portions 3s of the metal core 3 are cast in a casting die unit 30 including two dies 31 and 32 which are opened and closed vertically, in the axial direction of the ring portion 3r of the core, as shown in FIG. 5. The cavity surfaces 31a of the die 31 form the tops of the spoke portions 3s of the core 3, while the cavity surfaces 32a of the other die 32 form the bottoms of the spoke portions. Pin 33 is provided for setting the boss portion 3b, composed of the hub 3bb and the flange 3bp welded thereto. To manufacture the metal core 3 through the casting in the die unit 30, the boss portion 3b and the ring portion 3r thereof are set in between the dies 31 and 32 when they are spaced apart from each other, the dies are then closed, and the casting is thereafter performed. Since the fastening openings 5 and 6 provided in the vertical part 4 of each anterior spoke portion 3s(f) of the core 3 are not closed at the bottom they can be formed by the cavity surfaces 32a of the die 32 at the time of the casting. For that reason, the core 3 can be cast through the use of the two dies 31 and 32 without the use of a slide core, and the openings do not need to be formed by drilling or the like after the casting.

After casting, the core 3 is set in a prescribed molding die unit to form the coating layer 2 on the core. The lower cover (not shown) is then fastened to the layer 2. The steering wheel 1 is thus manufactured. The air bag module M, which has been assembled in advance, is then fastened to the wheel 1. At that time, the fastening holes 20a of the fastening portions 20 of the module M are aligned with the fastening openings 5 and 6 of the right and left anterior spoke portions 3s(f) of the metal core 3, the peripheral surface 17c of the bottom portion 17 of the holder 16 is put in contact with the seat surfaces 7a of the horizontal parts 7 of the anterior spoke portions, and the bolts 22 are inserted from outside into the holes and the openings and engaged in the nuts 21. The steering wheel unit W is thus manufactured.

When the air bag 12 is inflated with the gas from the inflator 13, contact of the bolts 22 with the vertical parts 4 of the anterior spoke portions 3s(f) at the top of the fastening openings 5 and 6 prevents upward movement of the air bag module M, and contact of the peripheral surface 17c of the bottom portion 17 of the holder 16 with the seat surfaces 7a of the horizontal parts 7 of the anterior spoke portions prevents downward movement of the module even though the bottoms of the openings are not closed. For that reason, the module M is firmly held even during inflation of the bag 12.

Since the fastening openings 5 and 6 provided in the vertical part 4 of each anterior spoke portion 3s(f) of the core 3 are not closed at the bottom they can be easily formed when the spoke portion is cast through the use of the vertically openable and closable die unit 30, without the use of the slide core. Furthermore, such openings do not need to be formed in metal core 3 by drilling or the like after casting. The metal core having the fastening openings 5 and 6 for fastening the air bag module M to the steering wheel 1 can thus be easily manufactured by die-casting.

Since the air bag module M is fastened to the fastening parts 8 constituted by the anterior spoke portions 3s(f) of the metal core 3 so as to be supported by the anterior spoke portions but not directly supported by the posterior spoke portions 3s(r), the rigidity of the module does not affect that of the posterior spoke portions.

Although the illustrated steering wheel 1 has the four spokes, the present invention may be embodied in a wheel which has three spokes, two anterior spokes and one posterior spoke. Furthermore, although the illustrated spoke portions 3s are made of the aluminum alloy or the like by die-casting, they may be made of steel or the like. The illustrated fastening part 8 of each anterior spoke portions 3s(f) has two fastening openings 5 and 6.

However, only a single fastening opening may be provided without departing from the invention. Even further, although the bolts 22 are illustrated for fastening the air bag module M to the steering wheel 1, rivets or the like may be used instead.

In the illustrated embodiment a bracket 19 is secured to the holder 16, and has fastening portions 20 having the fastening holes 20a for fastening the air bag module M to the steering wheel 1. However other fastening portions having fastening holes may be provided in an insert on the peripheral portion of the cover 11 or in the wall 18 of the holder 16, so as to extend down from the main portion of the insert or the wall. The spoke portions 3s of the metal core 3 are preferably die-cast. The bottom portion 3b and ring portion 3r thereof may be die-cast as well.

The foregoing description of preferred embodiments of the invention has been presented for purposes of illustration and description. The description is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A steering wheel unit comprising:
    a boss portion;
    a ring portion surrounding said boss portion;
    at least three spoke members for connecting said boss portion and said ring portion, said spoke members including right and left anterior spoke members which are disposed anteriorly with respect to the other spoke members, each of said spoke members having a metal core, the metal core of each of said right and left anterior spoke members including fastening parts, said fastening parts being provided solely on said metal cores of said right and left anterior spoke members;
    an air bag module fastened solely to said fastening parts of said metal cores of said anterior spoke members, said air bag module being disposed over said boss portion, said air bag module including:
        a bag holder made of a rigid material for holding an air bag, said bag holder having a bottom portion, and
        right and left brackets secured to said bottom portion, each said bracket having a fastening portion which is coupled with a respective said fastening part;
    said metal core of each of said anterior spoke members having a seat surface for contacting said bottom portion of said bag holder;
    said seat surfaces of said anterior spoke members being disposed over said fastening parts; and each said fastening part of said anterior spoke members having an opening comprising an open ended slot.

2. A steering wheel unit comprising:
    an air bag module, including a main body and right and left fastening portions which extend downwardly from the main body, said fastening portions having fastening holes defined therein extending substantially horizontally therethrough;

a steering wheel having a die-cast metal core defining right and left anterior spoke members, said core having fastening openings defined solely in the metal core of said right and left anterior spoke members, corresponding to said fastening holes and extending substantially horizontally therethrough;

wherein said module is fastened to said wheel solely by bolts fitted in said holes and said openings, said core having seat surfaces disposed above said openings so that a peripheral surface of a bottom portion of the body of said module, which is located outside said fastening portions, is in contact with said seat surfaces; and said openings comprise open ended slots.

* * * * *